March 25, 1969  W. KOLLENBERGER  3,434,727
FLUID-TIGHT SEALS FOR ROTATABLE SHAFTS AND THE LIKE
Filed Feb. 23, 1965
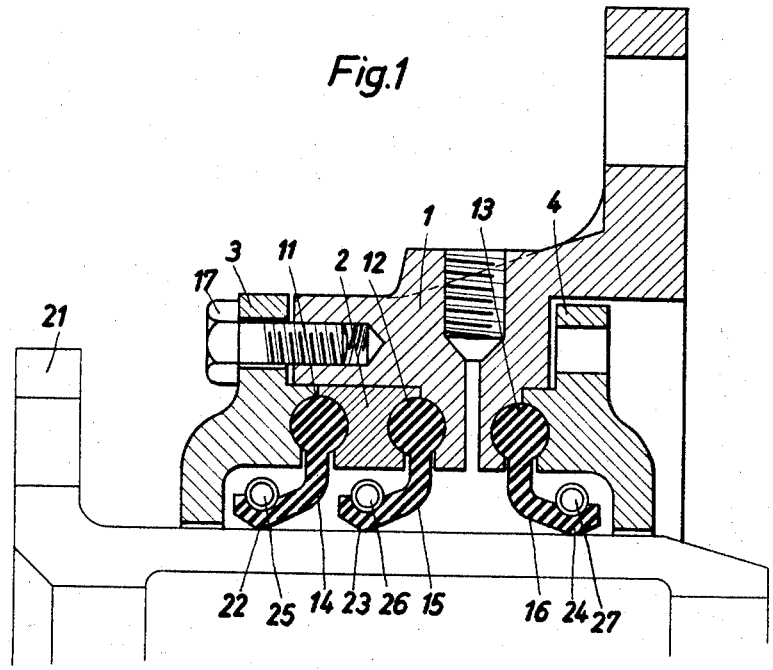
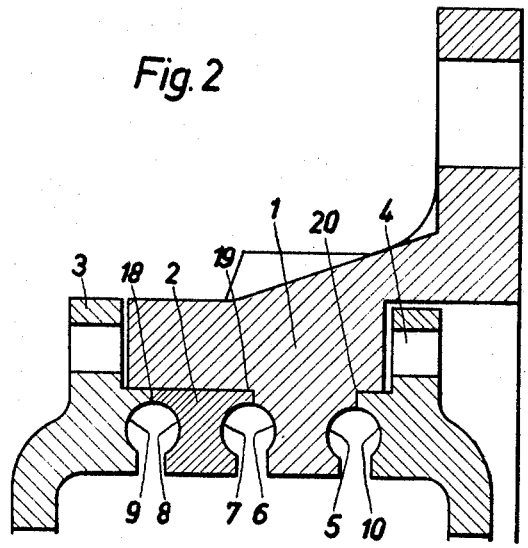
Inventor:
Walter Kollenberger
By Stevens, Davis, Miller & Mosher
Attorneys United States Patent Office 3,434,727
Patented Mar. 25, 1969

3,434,727
FLUID-TIGHT SEALS FOR ROTATABLE SHAFTS AND THE LIKE
Walter Kollenberger, Hamburg, Germany, assignor to Howaldtswerke-Deutsche Werft Aktiengesellschaft, Hamburg, Germany
Filed Feb. 23, 1965, Ser. No. 434,186
Claims priority, application Germany, Jan. 30, 1965, D 46,402
Int. Cl. F16j 15/00, 9/00; F16k 41/00
U.S. Cl. 277—58          9 Claims

ABSTRACT OF THE DISCLOSURE

A fluid tight seal for use around a rotatable machine part and having an annular non-rotatable housing surrounding said rotatable part and having an annular groove disposed in at least one face thereof, and at least one clamping ring member surrounding the rotatable part and having an annular groove facing the first-named groove and cooperating therewith to define an annular cavity. An annular sealing ring is also provided which has an outer portion of a substantially circular cross section disposed in the cavity, and an inner portion extending freely outward from the outer portion out of contact with the housing, this ring member engaging the rotatable part in a line contact to seal same.

---

This invention relates to fluid-tight seals for rotatable shafts and like machine parts and particularly to such seals employing elastic sleeves or rings for forming seals for fluid media such as water or oil. It has already been proposed to form such seals using elastic sleeves having flat outer peripheries like flanges, which are held between two housing parts, to prevent penetration of the medium along the shafts or like housing parts.

As is known, such flat seals require a substantial bearing pressure to ensure a satisfactory seal.

In addition, assembling such seals with elastic sleeves has to be carried out by experienced operatives as tightening the securing means too much on the outer periphery of the sleeve is harmful, as this causes the material of the sleeve flange to be deformed and forced towards the centre of the shaft, i.e. towards the sealing lip resulting in deformation of the lip and of the whole sleeve, whilst if the sleeve is insufficiently tightened this can result in leakage at the joint.

The said deformation is mostly effected so that the sealing lip of the sleeve, which seals on the rotating shaft, is displaced in an axial direction of the shaft, so that it no longer lies close to the shaft but has a surface of varying diameter. This, under certain circumstances, can result in the formation of a pocket of a hot medium on the sealing surface between the shaft and the sleeve, and in consequence to the destruction of the sleeve and to the seal becoming loose as the material of the sleeve is a poor conductor of heat and the frictional heat which occurs on the sealing lip is not rapidly dissipated.

The main object of the present invention is to provide such a fluid-tight seal in which deformation of the sleeve is minimised, and at the same time the clamping parts of the seal are firmly secured.

According to the present invention a fluid-tight seal for use round rotating shafts or like machine parts comprises a non-rotatable element surrounding the rotatable part, an annular part-spherical groove in said element, a clamping ring element surrounding said rotatable part, a part-spherical groove in said ring element facing the first-named groove and cooperating therewith to form an annular cavity of substantially circular cross section, a radially inwardly directed annular opening between said elements leading from said cavity, an annular sealing ring having in cross-section a spherical outer portion and an inwardly directed flange portion disposable in said cavity and opening respectively so that the flange surrounds the rotatable part and engages therewith, and means to force said elements towards each other to secure the sealing ring between them with the flange portion in fluid-tight engagement round the rotatable part.

Such sealing in accordance with the invention has great advantages of construction. The annular grooves in the said elements for clamping the ring are advantageously of equal thickness for all sizes of shaft, so that only one turning or milling tool is necessary to produce them.

In addition, the number of bolts or the like for forcing the housing parts together is minimised since the ring is clamped with a slight axial bearing pressure. The outer diameter of the housing is likewise considerably less than in conventional seals owing to the very short extent the clamping ring extends in a radial direction. In the axial direction too, the sealing of the housing is considerably shorter, as the bolts or the like for spanning the housing parts need not pass through the rings and the parts of the housing, but are disposed radially outside the clamping positions, simplifying the entire seal. The seal therefore provides substantial saving in material and weight.

Preferably the shape of the clamping ring profile on its outer periphery between the parts of the housing is such that when clamped the ring is not deformed to any substantial extent, so that the positioning of the sealing lip of the ring closely round the rotating shaft or the like is ensured.

The extent of deformation of the ring between the said elements is limited by forming the contiguous faces of the elements to abut each other. In this way not only can there be no deformation of the sleeve, but also tightness of the seal is provided.

In order that the invention may be more fully understood an embodiment in accordance therewith will now be described, by way of example, with reference to the accompanying drawing in which:

FIG. 1 shows a longitudinal cross section through the seal in the assembled state, and FIG. 2 shows a longitudinal section similar to FIG. 1 without the sleeves inserted.

Referring to the drawings, at one end of a housing 1 an intermediate ring 2 is mounted in a bore in the housing and fastened by a cover 3, whilst the other end of the housing 1 is sealed with a cover 4 preferably of the same size as the cover 3. The housing 1, the intermediate ring 2 and the covers 3, 4, are provided with annular slots 5, 6, 7, 8, 9, 10 of substantially semi-circular section forming three annular cavities, serving to take profiled rings 11, 12, 13 on the outer peripheries of sealing sleeves 14, 15, 16. The covers 3, 4 are fixed by screws 17 on to the housing 1, only one of which is shown, and they are tightened until the pressure on the ring profiles 11, 12, 13 of the sleeves 14, 15, 16 is defined simultaneously by the engagement of the contiguous surfaces of the metal housing parts 1, 2, 3, 4 at 18, 19, 20.

Sealing round a rotating shaft, which is advantageously provided with a bearing bush 21 to rotate therewith, is effected in a known manner by sealing lips 22, 23, 24 of sleeves 14, 15, 16, the lips being pressed by annular springs 25, 26, 27 on the bush 21.

The fluid-tight seal of the invention is usable on any rotating shaft or like part but is particularly useful on ships, for example, as sealing the stern tubes or ships and the propellor shafts, or for sealing parts of stabilising devices which are applied to the outer hull of a ship, or also for sealing the housings of water turbines.

What I claim is:

1. A fluid tight seal for use around a rotatable machine part, said seal comprising an annular non-rotatable housing surrounding said rotatable part and having an annular groove disposed in at least one face thereof; at least one clamping ring member surrounding said rotatable part and having an annular groove facing said first-named groove and cooperating therewith to define an annular cavity having a substantially circular cross section; an annular sealing ring having an outer portion of a substantially circular cross section disposed in said cavity, and an inner portion extending freely outward from said outer portion out of contact with said housing and with said clamping ring member, said outer portion having a greater thickness than said inner portion, said inner portion including a lip portion engaging said rotatable part in line contact to seal same; and means to force said housing and said clamping ring member together to secure said outer portion of said sealing ring in stress in said cavity; the diameter of the cross section of said sealing ring substantially corresponding to the diameter of the cross section of said cavity so that said stress is not imparted to said inner portion of said sealing ring.

2. The seal of claim 1, wherein said cavity also includes a portion in the form of a radially inwardly directed annular opening, said inner portion of the sealing ring being in the form of an inwardly directed flange freely disposed in said opening and terminating in said lip portion.

3. The seal of claim 1, further comprising at least one additional clamping ring member surrounding said rotatable part and having an annular groove facing a second groove in at least one of said first clamping ring members and cooperating therewith to form an additional annular cavity, an additional annular sealing ring having an outer portion of a substantially circular cross section disposed in said additional cavity and an inner portion extending freely outward from said additional outer portion out of contact with said clamping ring members and engaging said rotatable part to seal same, and means to force each of said clamping ring members together to secure said outer portion of said additional sealing ring in said additional cavity.

4. The seal of claim 3, wherein said clamping ring members are shaped so that when forced together deformation of the sealing ring is prevented.

5. The seal of claim 3, wherein the contiguous faces of said clamping ring members are shaped so that when said sealing ring is clamped in sealing engagement with the rotatable part, said faces are in surface-to-surface engagement.

6. The seal of claim 3, wherein the sealing ring is clamped between said clamping ring members with a slight bearing pressure.

7. The seal of claim 1 wherein said clamping ring member is shaped so that when forced together with said housing, deformation of the sealing ring is prevented.

8. The seal of claim 1 wherein the contiguous faces of said housing and said ring member are shaped so that when said sealing ring is clamped in sealing engagement with the rotatable part, said faces are in surface to surface engagement.

9. The seal of claim 1 wherein the sealing ring is clamped between said housing and said ring member with a slight bearing pressure.

References Cited

UNITED STATES PATENTS

| | | | |
|---|---|---|---|
| 2,789,844 | 4/1957 | Kessler | 277—169 X |
| 3,169,504 | 2/1965 | Gruber | 277—166 X |

FOREIGN PATENTS

| | | |
|---|---|---|
| 487,587 | 6/1938 | Great Britain. |
| 966,667 | 3/1950 | France. |
| 884,262 | 7/1953 | Germany. |

SAMUEL ROTHBERG, *Primary Examiner.*

U.S. Cl. X.R.

277—169, 187